US008869145B1

(12) United States Patent
Barve et al.

(10) Patent No.: US 8,869,145 B1
(45) Date of Patent: Oct. 21, 2014

(54) METHOD AND SYSTEM FOR MANAGING STORAGE FOR VIRTUAL MACHINES

(75) Inventors: Anagha Barve, Sunnyvale, CA (US); Mohandas Gopal, Pleasanton, CA (US); Vineeth Karinta, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 846 days.

(21) Appl. No.: 13/096,971

(22) Filed: Apr. 28, 2011

(51) Int. Cl.
G06F 9/455 (2006.01)
G06F 12/00 (2006.01)
G06F 9/50 (2006.01)
G06F 12/10 (2006.01)
G06F 17/30 (2006.01)
G06F 3/06 (2006.01)

(52) U.S. Cl.
CPC .............. *G06F 9/5077* (2013.01); *G06F 9/455* (2013.01); *G06F 12/1036* (2013.01); *G06F 12/109* (2013.01); *G06F 17/30233* (2013.01); *G06F 3/0662* (2013.01); *G06F 3/0664* (2013.01); *G06F 3/0665* (2013.01)

USPC ................................................. 718/1; 711/6

(58) Field of Classification Search
None
See application file for complete search history.

(56) References Cited

U.S. PATENT DOCUMENTS 8,479,194 B2 * 7/2013 Rangegowda et al. ............ 718/1

\* cited by examiner

*Primary Examiner* — Qing Wu
(74) *Attorney, Agent, or Firm* — Klein, O'Neill & Singh, LLP

(57) ABSTRACT

Method and system is provided to correlate a virtual hard disk file or a pass through disk to a storage drive that is presented to a user via a virtual machine. A data structure is generated that associates a virtual hard disk path or a pass through disk identifier with a unique identifier of a virtual storage controller and a location of the drive as maintained by an operating system of a computing system where the virtual machine is executed. The unique identifier and the location are then used to correlate a storage drive to a virtual hard disk path or a pass through disk.

26 Claims, 9 Drawing Sheets

METHOD AND SYSTEM FOR MANAGING STORAGE FOR VIRTUAL MACHINES

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual environments where a physical resource is time-shared among a plurality of independently operating processor executable virtual machines. Typically, storage space is presented to a virtual machine as a virtual hard disk (VHD) file. A storage drive (for example, C:\) is then presented to a user via a user interface within a virtual machine context. The user can use the storage drive to access storage space to read and write information.

In some instances, a user may be presented with multiple drives within a virtual machine. Each of the multiple drives may represent different replicated copies of storage space including stored files (may also be referred to as data containers). The user however is unaware as to which drive represents which backup/VHD. If the user wants to restore a single data container from one of the presented drives, the user has to manually attempt to determine which drive represents which VHD that may include the single data container. The manual process of correlating the drives with the VHDs can be tedious and time consuming, which is undesirable in today's storage environment where multiple backups are taken for safely replicating information. Therefore, continuous efforts are being made to improve user experience in accessing storage space using virtual machines.

SUMMARY

In one embodiment, a method and system is provided to correlate a storage drive presented to a user via a virtual machine with a virtual hard disk file or a "pass through" disk. A storage system presents storage space to a virtual machine monitor that manages a plurality of virtual machines. The virtual machine monitor uses a virtual hard file that is created within a file system to present the storage space to the virtual machine. The virtual machine monitor may also present the storage space without the file system as a pass through disk.

A data structure is generated by a processor for associating a virtual hard disk path or a pass through disk identifier with a unique identifier of a virtual storage controller and a location of the drive as maintained by an operating system of a computing system where the virtual machine is executed. The unique identifier and the location are then used to correlate a storage drive to a virtual hard disk path or a pass through disk.

In another embodiment, a machine implemented method for a storage operating environment having a processor executable virtual machine using a storage system for storing information at a storage device is provided. The method includes providing a path for a data container to a processor executable application, where the data container is used for presenting a virtual storage drive to the virtual machine for accessing storage space at the storage device. The processor executable application generates a data structure for correlating the data container with the virtual storage drive by querying a management interface module executed by a computing system to obtain an identifier of a virtual controller for the virtual storage drive and a location of the virtual storage drive maintained by the virtual controller. The processor executable application uses the identifier and the location to correlate the data container with the virtual storage drive presented by the virtual machine to a user.

In yet another embodiment, a system is provided. The system includes a computing system executing a virtual machine that uses a storage system for storing information at a storage device. The system also includes a processor executable application that receives a path for a data container, where the data container is used for presenting a virtual storage drive to the virtual machine for accessing storage space at the storage device.

The processor executable application is configured to generate a data structure for correlating the data container with the virtual storage drive by querying a management interface module executed by the computing system to obtain an identifier of a virtual controller for the virtual storage drive and a location of the virtual storage drive maintained by the virtual controller. The processor executable application uses the identifier and the location to correlate the data container with the virtual storage drive and presents the correlation via a user interface on a display device.

In another embodiment, a machine implemented method for a storage operating environment having a processor executable virtual machine using a storage system for storing information at a storage device. The method includes generating a data structure for correlating a data container to a virtual storage drive presented by a virtual machine to a user for accessing storage space at the storage device.

A processor executable application generates the data structure by querying a management interface module to obtain an identifier of a virtual controller for the virtual storage drive and a location of the virtual storage drive as maintained by the virtual controller. The processor executable application then uses the identifier and the location to correlate the data container with the virtual storage drive and presents the correlation to the user.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system is provided to correlate a virtual hard disk file or a pass through disk to a storage drive presented to a user via a virtual machine. A data structure is generated that associates a virtual hard disk path or a pass through disk identifier with a unique identifier of a virtual storage controller and a location of the drive as maintained by an operating system of a computing system where the virtual machine is executed. The unique identifier and the location are then used to correlate a storage drive to a virtual hard disk path or a pass through disk.

Figure 1A:
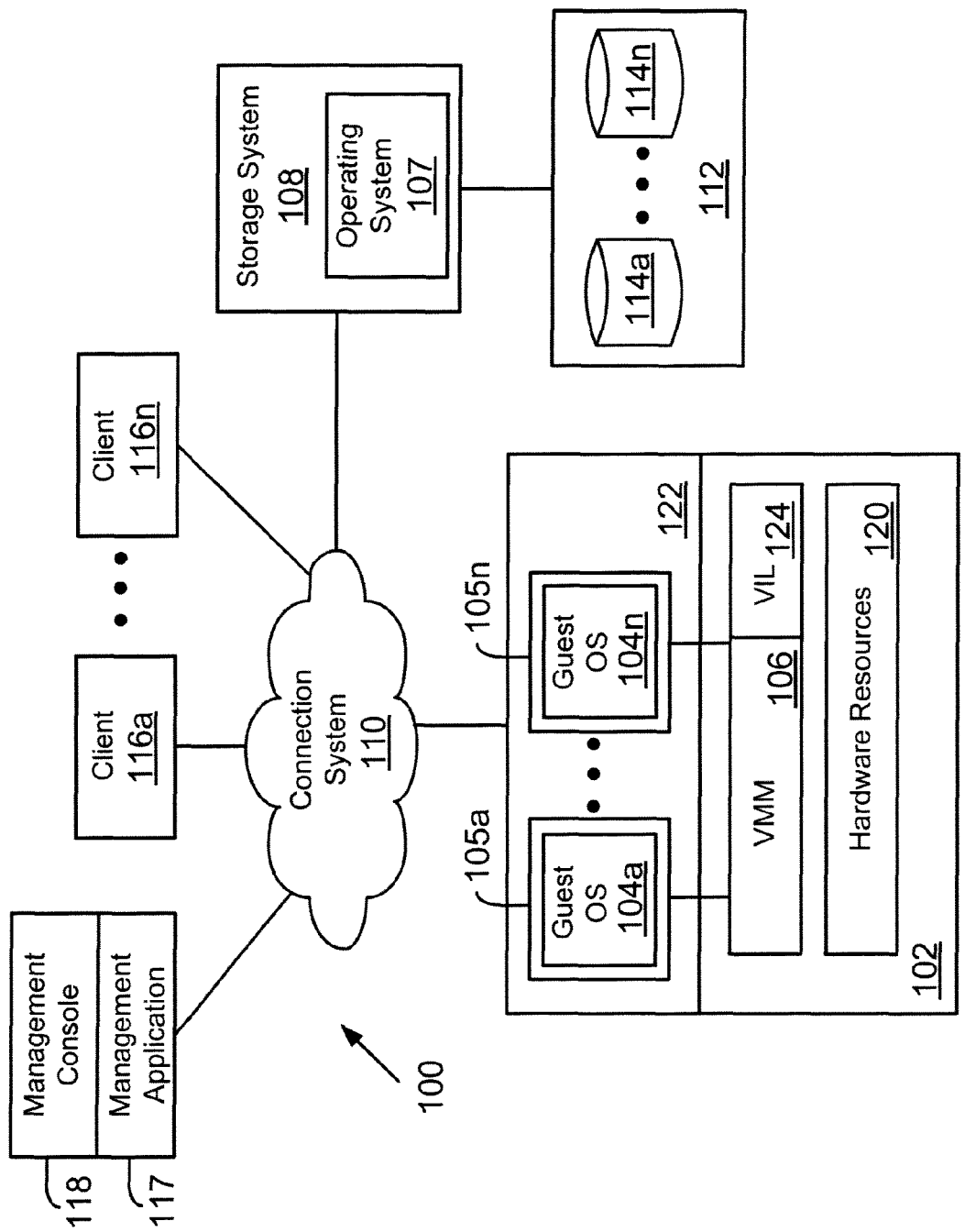
FIG. 1A shows an example of a storage operating environment for the various embodiments disclosed herein.

System 100:

FIG. 1A shows an example of a system 100, where the adaptive embodiments disclosed herein may be implemented. System 100 includes a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one embodiment, system 100 includes at least a computing system 102 (may also be referred to as a host platform 102 or server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

System 100 may also include a management console 118 that executes processor executable instructions, for example, a management application 117 for managing and configuring various elements of system 100. One or more client computing systems 116a-116n (may also be referred to as client system 116) may also be provided for generating input/output requests for reading and writing information or for any other reason.

Host platform 102, management console 118 and client system 116 may be general purpose computers having a plurality of components. As described below in more detail, these components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

In one embodiment, the storage system 108 has access to a set of mass storage devices 114a-114n (may be referred to as storage devices 114) within at least one storage subsystem 112. The mass storage devices 114 may include writable storage device media such as magnetic disks, video tape, optical, DVD, magnetic tape, non-volatile memory devices for example, self-encrypting drives, flash memory devices and any other similar media adapted to store information. The storage devices 114 may be organized as one or more groups of Redundant Array of Independent (or Inexpensive) Disks (RAID). The embodiments disclosed are not limited to any particular storage device or storage device configuration.

The storage system 108 provides a set of storage volumes to the host platform 102 via connection system 110. The storage operating system 107 can present or export data stored at storage devices 114 as a volume, or one or more qtree sub-volume units. Each volume may be configured to store data files (or data containers or data objects), scripts, word processing documents, executable programs, and any other type of structured or unstructured data. From the perspective of one of the client systems, each volume can appear to be a single disk drive. However, each volume can represent the storage space in one disk, an aggregate of some or all of the storage space in multiple disks, a RAID group, or any other suitable set of storage space.

The storage devices or storage space at storage devices 114 may be presented as a "logical unit number" (LUN) where a LUN may refer to a logical data container that looks like a storage device to a host (client) but which actually may be distributed across multiple storage devices by storage system 108.

It is noteworthy that the term "disk" as used herein is intended to mean any storage device/space and not to limit the adaptive embodiments to any particular type of storage device, for example, hard disks.

The storage system 108 may be used to store and manage information at storage devices 114 based on a request generated by a management console 118, client system 116 and/or a VM. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, the client system 116 transmits one or more input/output (I/O) commands, such as an NFS or CIFS request, over connection system 110 to the storage system 108. Storage system 108 receives the request, issues one or more I/O commands to storage devices 114 to read write the data on behalf of the client system, and issues an NFS or CIFS response containing the requested data over the network 110 to the respective client system.

Although storage system 108 is shown as a stand-alone system, i.e. a non-cluster based system, in another embodiment, storage system 108 may have a distributed architecture; for example, a cluster based system that may include a separate N-("network") blade and D-(disk) blade. Briefly, the N-blade is used to communicate with host platform 102 and clients 116, while the D-blade is used to communicate with the storage devices 114 that are a part of a storage subsystem. The N-blade and D-blade may communicate with each other using an internal protocol.

Alternatively, storage system 108 may have an integrated architecture, where the network and data components are all contained in a single box. The storage system 108 further may be coupled through a switching fabric to other similar storage systems (not shown) which have their own local storage subsystems. In this way, all of the storage subsystems can form a single storage pool, to which any client of any of the storage servers has access.

Information stored at storage devices 114 is typically backed up (or replicated) at one or more storage locations (not shown). A backup of a file or a file system includes copying and storage of a directory and/or tree structure of the file system. A processor executable backup process may use image taking technology (e.g., the Snapshot™ technology provided by NetApp® Inc. of Sunnyvale, Calif.) (without derogation of trademark rights of NetApp® Inc.) to backup all or a portion of the file system. The image(s) can be used later during a restore process.

A snapshot is a persistent point in time (PPT) image of the active file system that enables quick recovery of data after data has been corrupted, lost, or altered. Snapshots can be created by copying the data at each predetermined point in time to form a consistent image. The terms snapshot and backup are used interchangeably throughout this specification. It is noteworthy that the adaptive embodiments described herein are not limited to using any particular imaging technology.

In some embodiments, the backup process produces backup information that may include metadata that is stored by storage system 108. The backup information includes information describing the backup performed on the file system (e.g., a time stamp, filenames, and/or location information). The backup information and images are used later to restore the imaged file system or a portion thereof.

A restore operation using the metadata may be performed for a variety of reasons. For example, a restore operation may be performed when an error occurs in the file system, in an application, in the server or storage operating system, or in the other applications that causes a "crash" and reboot of the server system or the storage system. A restore may be performed when data in the file system have been undesirably altered, corrupted, and/or deleted, for example, by a computer virus or other malignant code. If a file has undesirably become altered, corrupted, and/or deleted, it is advantageously restored by copying and/or replacing it by using a previously stored image thereof.

The restore process is configured to restore part of the file system. The restore process retrieves the backup information and/or image(s) for the part of the file system. The restore process then restores the part of the file system by using the backup information and/or images. The restore process may do so by deleting and replacing files of the file system with files from the backup images. Alternatively, the set of original data files may have been deleted and may not exist and thus are replaced by the retrieved backup information and images.

Referring back to FIG. 1A, host platform 102 also includes a processor executable virtual execution environment 122 executing a plurality of VMs 105a-105n. VMs 105a-105n execute a plurality of guest OS 104a-104n (may also be referred to as guest OS 104) that share hardware resources 120. As described above, hardware resources 120 may include CPU, memory, I/O devices, storage or any other hardware resource.

In one embodiment, host platform 102 may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104a-104n executed by the host platform 102. The VMM 106 may include or interface with a virtualization layer (VIL) 124 that provides one or more virtualized hardware resource to each OS 104a-104n.

In one embodiment, VMM 106 is executed by host platform 102 with VMs 105a-105n. In another embodiment, VMM 106 may be executed by an independent stand-alone computing system, often referred to as a hypervisor server or VMM server and VMs 105a-105n are presented on another computing system. It is noteworthy that various vendors provide virtualization environments, for example, VMware Corporation, Microsoft Corporation and others. The generic virtualization environment described above with respect to FIG. 1A may be customized depending on the virtual environment provider.

Figure 1B:
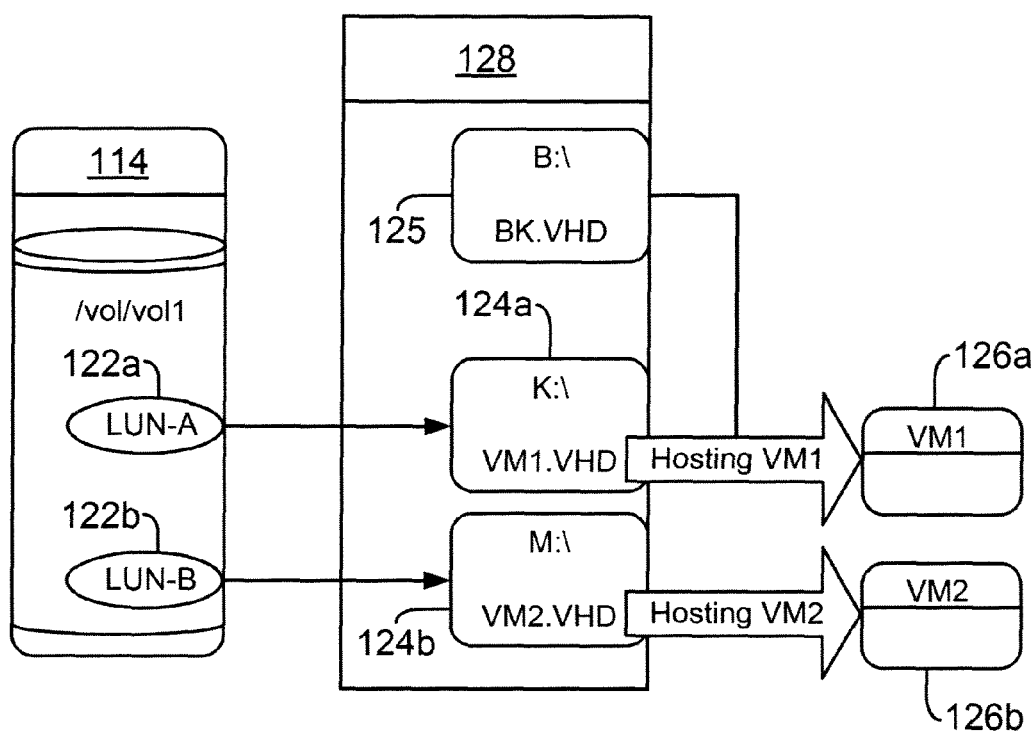
FIG. 1B shows an example of presenting storage space to a virtual machine, according to one embodiment.

FIG. 1B shows an example of presenting logical storage space to one or more virtual machines. Storage system 108 typically presents storage space at storage device 114 as a LUN to a parent system 128 (for example, a Hyper-V server executed by host platform 102 and provided in a Windows® (without derogation of trademark rights of Microsoft Corporation) operating virtual environment). For example, LUN-A 122a and LUN-B 122b are presented to the parent system 128 that hosts a plurality of VMs 126a (VM1)-126b (VM2), similar to VMs 105a-105n.

The parent system 128 then creates a file system for example, a NTFS file system (used in a Windows® operating system environment) on the LUNs and generates one or more virtual hard drive (VHD) files for each LUN. The user is presented with a storage drive within a virtual machine. For example, the VHD file VM1.VHD 124a is created on LUN-A 122a and then presented as drive K:\ to VM1 126a. A user using VM1 126a uses K:\ to access storage space for reading and writing information. Similarly, VM2.VHD 124b is created on LUN-B 122b and appears as M:\ drive for VM 126B. A user using VM2 126a uses M:\ drive to store information.

In some instances, parent system 128 does not create a file system for the LUNs and instead the LUNs are presented directly to the VM as a storage drive. The storage drives in such an instance may be referred to as "pass through" disks. The terms VHD and pass through disks as used herein for presenting a virtual storage drive to a user via a VM are used interchangeably throughout this specification.

Multiple VHDs (or pass through disks) may be presented to a VM, which then are presented as separate drives to a user. For example, if LUN-A 122a is backed up then VHDs from the backed up LUN are presented to the VM, for example, B:\ that can be used for a restore operation. Drive B:\ in this example is associated with VHD file 125. If multiple backup copies are presented within a VM, then they all may appear as separate drives.

One challenge with this situation is that a user does not easily know which VHD is associated with which disk within a VM context and hence does not know which drive represents a particular backup. The embodiments disclosed herein generate a data structure based on which one is able to correlate a VHD to a disk within the VM context and hence a user using a VM is able to associate a drive with a particular backup.

Figure 1C:
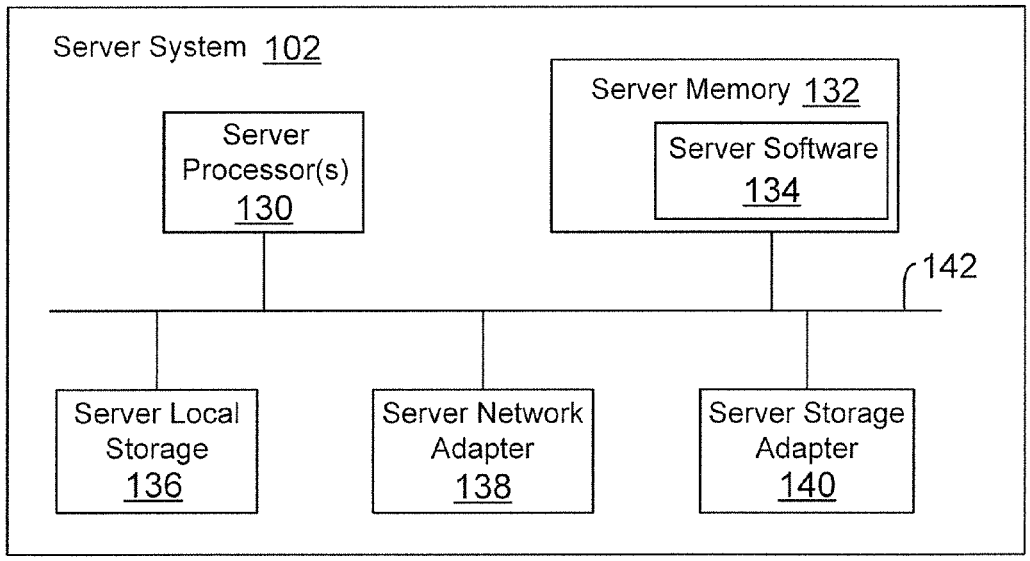
FIGS. 1C-1D shows an example of a host platform, according to one embodiment.
Figure 1D:
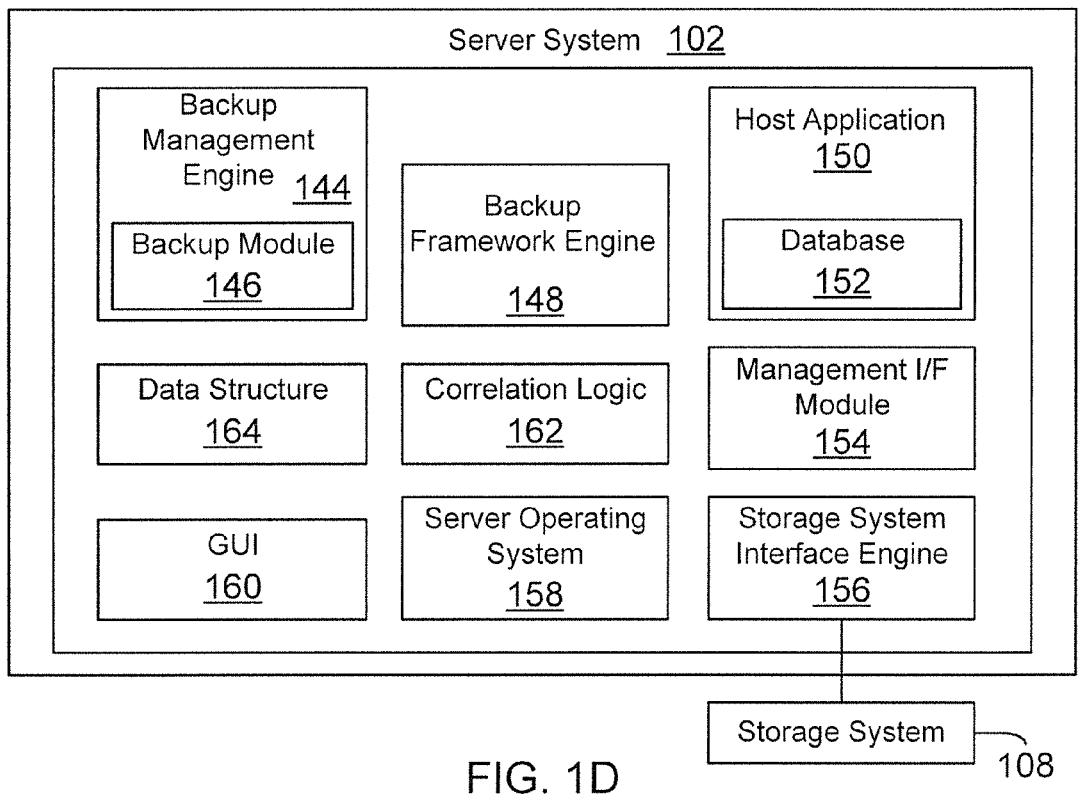

Host Platform 102:

Before describing the embodiments in detail, the following provides a brief description of host platform 102 (may also be referred to as server system 102) with respect to FIGS. 1C-1D. Note, certain standard components used by server system 102 that are not germane to the embodiments disclosed herein have not been described.

The server system 102 comprises server processor(s) 130, a server memory 132, a server network adapter 138, a server storage adapter 140, and a server local storage 136 coupled by a bus system 142. The bus system 142 is an abstraction that represents any one or more separate physical buses and/or point-to-point connections, connected by appropriate bridges, adapters and/or controllers. The bus system 142, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The server processors 130 are the central processing units (CPUs) of the server system 102 and, thus, control the overall operation of the server system 102. In certain embodiments, the server processors 130 accomplish this by executing programmable instructions out of server memory 132. The server processors 130 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The server memory 132 comprises storage locations that are addressable by the processor 130 and adapters, for example, the server network adapter 138 and the server storage adapter 140. The storage locations are for storing executable instructions that preferably include server software 134. The server processor 130 and the server adapters may, in turn, comprise processing elements and/or logic circuitry configured to execute the programmable code and manipulate various data structures.

The server memory 132 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein.

The server network adapter 138 comprises a plurality of ports adapted to couple the server system 102 to one or more client systems 116 (shown in FIG. 1A) over point-to-point links, wide area networks, virtual private networks implemented over a public network (Internet) or a shared local area network. The server network adapter 138 thus may comprise the mechanical, electrical and signaling circuitry needed to connect the node to the network.

The server storage adapter 140 facilitates access to the storage devices 114 (shown in FIG. 1A). The server storage adapter 140 comprises a plurality of ports having input/output (I/O) interface circuitry that couples to the devices 110 over an I/O interconnect arrangement, such as a conventional high-performance, Fibre Channel (FC) link topology.

In one embodiment, server network adapter 138 and server storage adapter 140 may be integrated into a single converged adapter that can handle both network and storage traffic. An example of such a converged adapter is a Fibre Channel over Ethernet (FCOE) adapter.

The server system 102 also has access to local storage 136 which is a mass storage device that may store information within the server system 102, such as executable instructions 134 (also referred to as server software 134 that may include correlation logic 162 or portions thereof, FIG. 1D), the server operating system 158 (FIG. 1D) and/or data. The server system 102 loads server software 134 into the server memory 132 from which they are accessed by the server processors 130. The server local storage 136 may be or may include any conventional medium for storing large volumes of data in a non-volatile manner, such as one or more magnetic or optical based disks, flash memory and other types of storage devices.

FIG. 1D shows an example of an architecture used by the server system 102 of FIG. 1C. In some embodiments, the server system 102 executes a server operating system 158; a management interface module 154, correlation logic 162 or portions thereof, one or more host application(s) 150, which may use database 152; a backup management engine 144 having or interfacing with a backup module 146; a user interface engine (GUI) 160; a backup framework engine 148 and a storage system interface engine 156.

The server operating system 158 includes executable instructions that are executed out of server memory 132 for managing host applications and other operations. The server operating system 158 can be, for example, UNIX®, Windows NT®, Linux®, or any other operating system. In one embodiment, the parent operating system 128 (FIG. 1B) and the VMs may be executed within an operating system 158 context. In another embodiment, the VMs are executed in other computing systems, while the parent operating system 128 is executed at server system 102.

Operating system 158 interfaces or includes a management interface module 154. In one embodiment, management interface module 154 may include a Windows Management Instrumentation (WMI) module that maintains information regarding various components of server system 102. Server system 102 also includes correlation logic 162 that maintains a data structure 164 to correlate a VHD (or a pass through disk) with a storage drive as presented by a VM, according to one embodiment. In another embodiment, correlation logic 162 or portions thereof may be executed by management console 118, client 116 or any other computing system. Details regarding correlation logic 162 are provided below.

The host application(s) 150 can be any application used for servicing client 102 requests. Host applications 150 may include an email server application, a database management application and other applications.

Information stored in storage devices 114 and managed by storage system 108 may be backed up by the backup management engine 144. The backup-management engine 144 using backup module 146 may initiate a backup of a file and/or file system e.g., by sending a command to the storage system 108 via the storage system user interface engine 156 and the backup framework engine 148. The storage operating system 107 (shown in FIG. 1A) of storage system 108 generates one or more images relating to the file system to backup all or a portion of the file system e.g., a single file, multiple files, a drive, a disk, multiple drives or disks, and/or one or more volumes including multiple drives.

After the backup is performed, the storage operating system 107 notifies the backup management engine 144 that the backup operation is completed. In some embodiments, as described above, a restore operation is later performed by using the generated images, and/or the backup information.

For each backup, the backup management engine 144 may also cause the storage system 108 to generate backup information that is stored to the storage system 108. The backup information may be in the form of metadata, and may include information about a backup, for example, identification for the backup, a time stamp when the backup was performed, and filenames, directory locations on the storage device(s) 114, and/or the directory path where backups are stored. The backup information may be used later to restore the file system and/or portions thereof, for instance, in case of a system crash, data corruption, virus, or a similar occurrence.

In some embodiments, the backup management engine module 146 uses the image taking technology (e.g., Snapshot™ technology provided by NetApp® Inc. of Sunnyvale, Calif.) to backup all or a portion of the file system. In some embodiments, the backup module 146 includes SnapManager®, (without derogation of trademark rights of NetApp Inc.) a program provided by NetApp® Inc. of Sunnyvale, Calif. to take snapshots.

The backup framework engine 148 may be used to help implement backup functions. More specifically, the backup framework engine 148 may be used to help integrate the various backup components of the host application 150, the backup management engine 144, and/or the storage system interface engine 156. In some embodiments, the backup framework engine 148 includes a VSS (Volume Shadow Services) layer, a processor executable software module provided by Microsoft Corporation. VSS may coordinate backup operations with applications that may be running on the server system 102 as well the storage system 108.

The storage system interface engine 156 may be configured to act as an interface between the server system 102 and the storage system 108. The storage system interface engine 156 communicates with the storage system 108 by using, for example, a Zephyr Application and Programming Interface (ZAPI) protocol. In particular, the storage system interface engine 156 interacts with the backup management engine 144 and/or backup framework engine 148 to receive and perform requests made by the backup management engine 144 by interacting with other software programs of the server system 102 or the storage system 108.

In some embodiments, the storage system interface engine 156 includes SnapDrive® (without derogation of trademark rights of NetApp Inc.), a program provided by NetApp Inc. of Sunnyvale, Calif. for interfacing with SnapManager® and the storage operating system 107. It is noteworthy that the adaptive embodiments described herein are not limited to using SnapDrive®, any other module may be used for interfacing with the storage operating system.

As mentioned above, backup module 146 may take multiple snapshots. The snapshot copies are presented to the VMs as VHD files. The user is then presented with a number of drives. The user using a VM however may not be aware of the correlation between a specific VHD and a drive. Correlation logic 162 executing processor executable process steps generates data structure 164, which is used to correlate a VHD with a drive presented to a user. Correlation logic 162 and associated methods thereof, are described below with respect to FIGS. 1E, 1F and 1G.

Figure 1E:
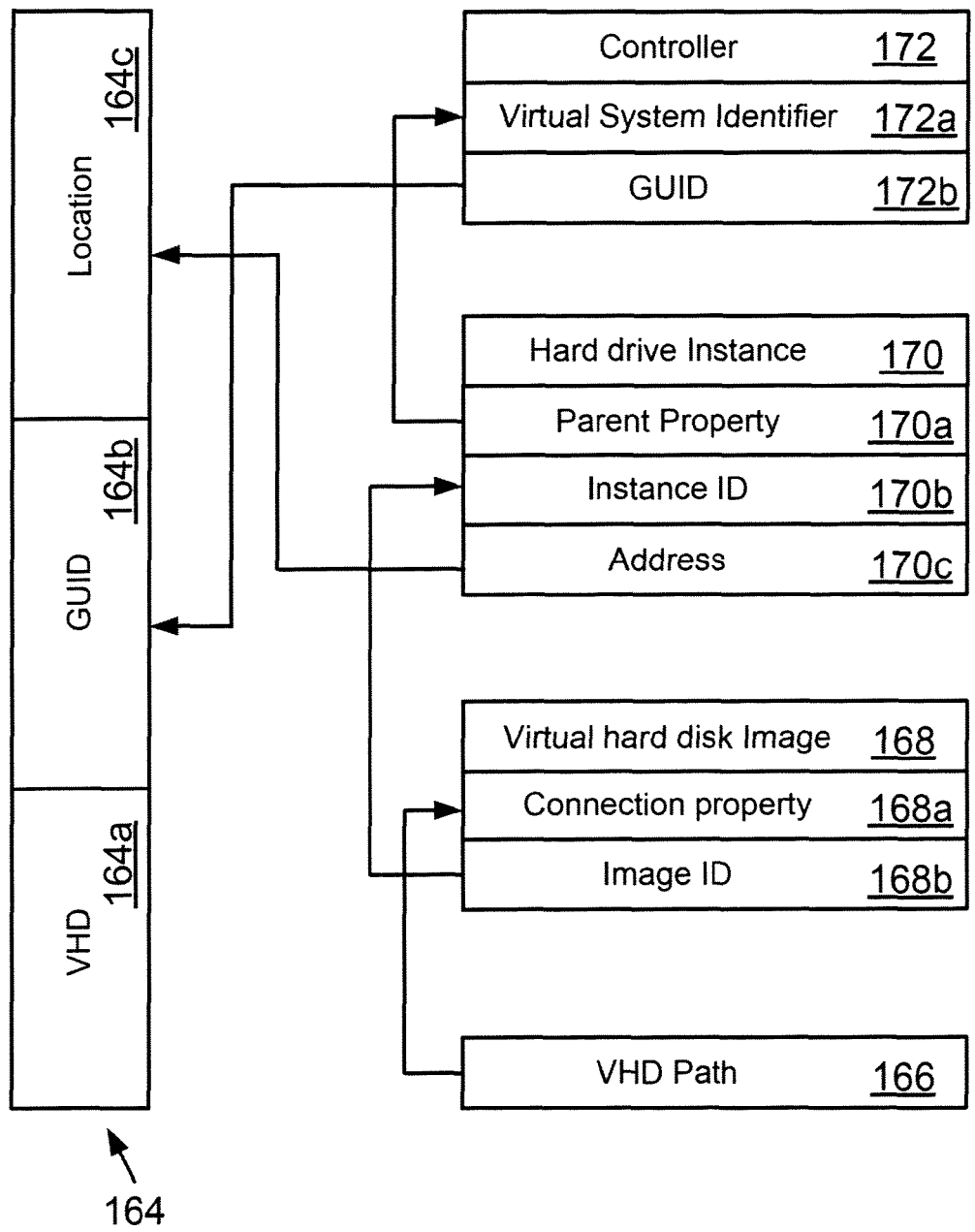
FIG. 1E shows a block diagram of an architecture for correlating a virtual storage space to a storage drive presented to a virtual machine, according to one embodiment.

FIG. 1E shows an example of data structure 164 generated by correlation logic 162 used for correlating a VHD/pass through disk to a storage drive presented to a VM, according to one embodiment. As an example, data structure 164 may include fields' 164a-164c. Field 164a shows a path for a VHD that is presented to a VM by a parent system 128. For a pass through disk, field 164a may include a unique identifier for the pass through disk. Field 164b includes a global unique identifier (GUID) for the drive that is maintained by operating system 158 and derived by correlation logic 162. The location of the drive as managed by the operating system 158 is included in field 164c and also derived by correlation logic 162 as described below in detail.

The various fields of data structure 164 are derived by issuing one or more queries to management interface module 154 that maintains a plurality of objects, for example, a virtual hard disk image 168, a hard drive instance 170 and a controller 172 having information regarding fields 164b-164c.

VHD path 166 (similar to VHD 164a) is used to obtain the virtual hard disk image 168. Virtual hard disk image 168 includes a connection property 168a that matches with the VHD path 166. The virtual hard disk image 168 also includes a parent property that includes a hard disk image identifier 168b (shown as "Image Id"). Image Id 168b matches with an Instance Identifier (shown as "Instance Id") 170b of the hard drive instance 170. Hard drive instance 170 includes a parent property 170a and an address property 170c. The parent property 170a includes a controller identifier which matches an identifier for controller 172. As an example, controller 172 may be referred to as a SCSI controller and the identifier for controller 172 may be referred to as a SCSI controller instance identifier. The address property 170c provides the location 164c which is the virtual location of the storage drive associated with the VHD path 166 as maintained by operating system 158.

Correlation logic 162 uses parent property 170a to obtain a virtual system identifier 172a from controller object 172. Virtual system identifier 172a includes the GUID 172b that is used to populate field 164b of data structure 164. The GUID 172b is the unique identifier of the storage drive associated with the VHD path 166 as maintained by operating system 158. As described below in more detail using the GUID 172b and location 154c and executable instructions within the VMs, one is able to correlate a VHD with a storage drive that is presented to a user.

Figure 1F:
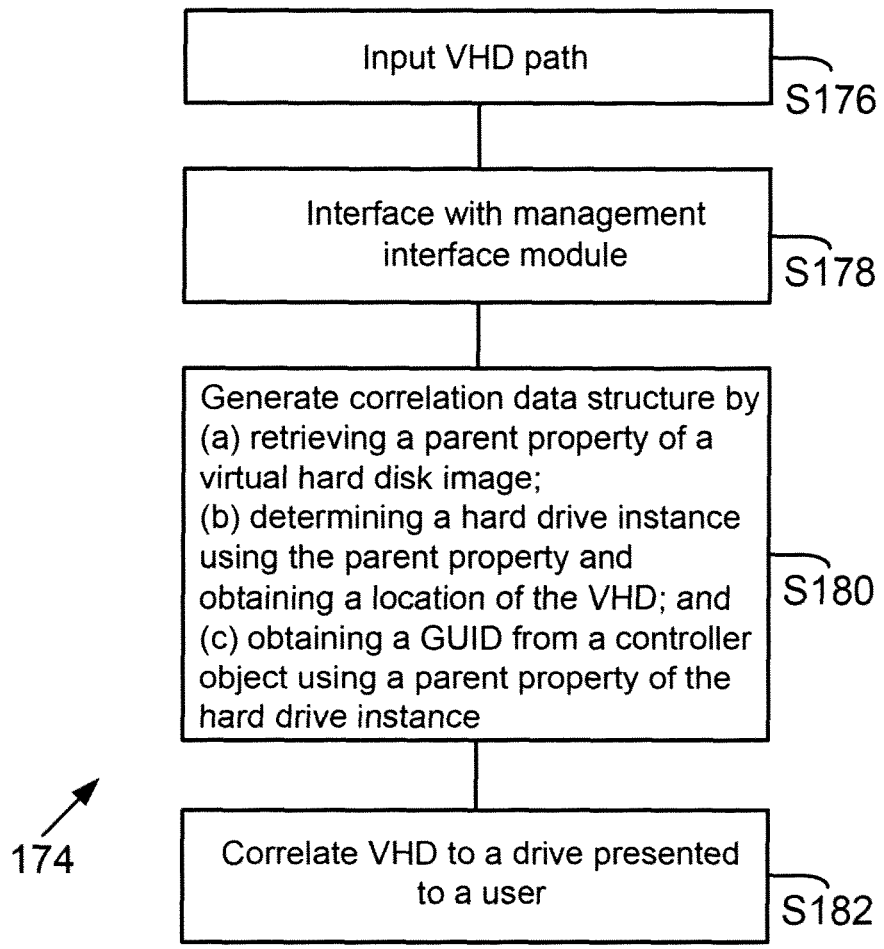
FIGS. 1F-1G show process flow diagrams, according to one embodiment.

Process Flow:

FIG. 1F shows a process flow diagram 174 for correlating a VHD with a disk maintained by the operating system/VM, according to one embodiment. Process 174 is described below with reference to FIGS. 1D-1E. The process begins in block S176, when a VHD file path 166 is provided to correlation logic 162. The VHD file path may be for one or more VHD files.

In block S178, correlation logic 162 interfaces with management interface module 154 that maintains objects 168, 170 and 172 that have been described above with respect to FIG. 1E. In one embodiment, correlation logic 162 issues one or more queries to management interface module 154.

In block S180, correlation logic 162 generates fields' 164b-164c of data structure 164. These fields maybe generated as follows; (a) VHD path 166 is used to search for the virtual hard disk image 168 whose "connection property" matches with the VHD path. The virtual hard disk image also includes a parent property that includes an identifier 168b for the hard disk image 168. (b) Identifier 168b is then used to search for a hard drive instance 170 whose instance identifier 170b matches identifier 168b. Hard drive instance 170 includes a parent property 170a and an address field 170c. The address field 170c provides a location of the drive that is associated with the VHD. (c) The parent property 170a is used to find a controller object 172 that includes the virtual system identifier 172a. The virtual system identifier 172a includes the GUID 172b for the drive that is associated with the VHD path 166.

Block S180 as described above is for a VHD file. A similar process is used when a pass through disk having a unique disk identifier (disk ID) is provided to a VM. The disk ID is input to correlation logic 162. Using the disk ID, a disk drive instance whose "DriveNumber" property matches with the input disk ID is obtained. The disk drive instance is used to obtain an object "Physical Disk Drive" whose "HostResource" property matches with the disk drive instance. The address property of this object provides the location 164c. The controller instance 172 is then obtained using a parent property of the Physical disk drive instance. The virtual system identifier 172a is then used to obtain the GUID 172b.

In one embodiment, the executable blocks S176, S178 and S180 for both VHDs and pass through disks are executed within a parent operating system 128 context.

In block S182, data structure 164 is used to correlate the VHD path with a drive presented by a VM to a user. The correlation may be presented to the user at a display device either in a graphical user interface (for example, GUI 160, FIG. 1D) or as part of a command line interface (CLI). Details of block S182 are provided below with respect to FIG. 1G. In one embodiment, processor executable instructions for block S182 are executed within a guest OS (104a-104n) context. Hence, a portion of correlation logic 162 (FIG. 1D) is executed by a processor of a parent system, while another portion is executed within a VM context.

Figure 1G:
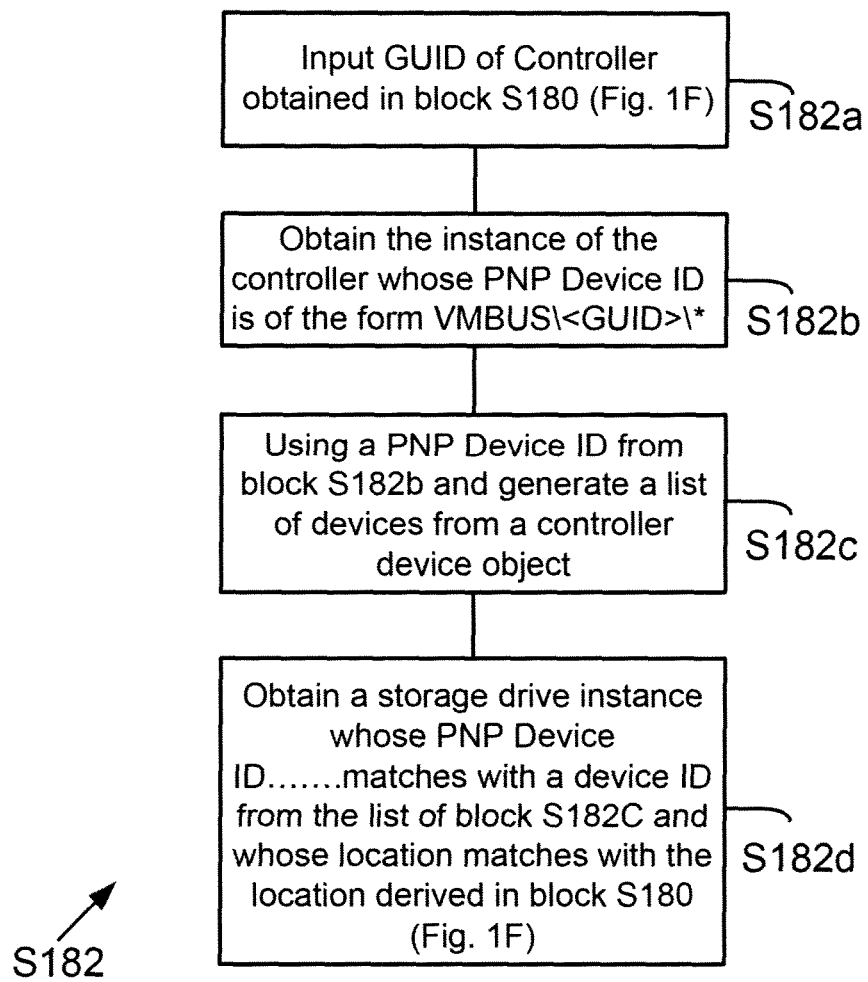

Referring now to FIG. 1G, the GUID 172b obtained in block S180 (FIG. 1F) is input to management interface module 154 that maintains a data structure for storing properties of different instances of controller 172. In block S182b, a controller instance whose identifier (may also be referred to as "PNPDeviceID" (Plug-N-Play Device Identifier) is of the format VMBUS<GUID>*. The term VMBUS in this context means a virtual machine bus. The PNPDeviceID of the controller instance is also obtained in block S182b. The PNPDeviceID is then used in block S182c to generate a data structure having a plurality of PNP entity devices that are dependent on the controller device object. Using the data structure generated in block S182, a storage drive instance, for example, Win#2_Disk Drive, is obtained in block S182d. The storage drive instance has a PNPDeviceID that matches with a DeviceID in the data structure generated in block S182C and whose SCSILogicalUnit property matches with the location that is derived in block S180 of FIG. 1F and is input from the portion of correlation logic 162 executed by parent system 128.

The process and structures described above have various advantages. For example, if a user is presented with a plurality of drives, the user is able to correlate the drives with the underlying details of VHDs based on the process flow described above. This allows the user to locate a drive that the user may need. This is especially useful, if the user is trying to restore a single file or a data container that may be located at one of the plurality of drives because the user is able to identify which storage drive in the VM is mounted from which backup. This allows the user to restore a single data container.

Figure 2:
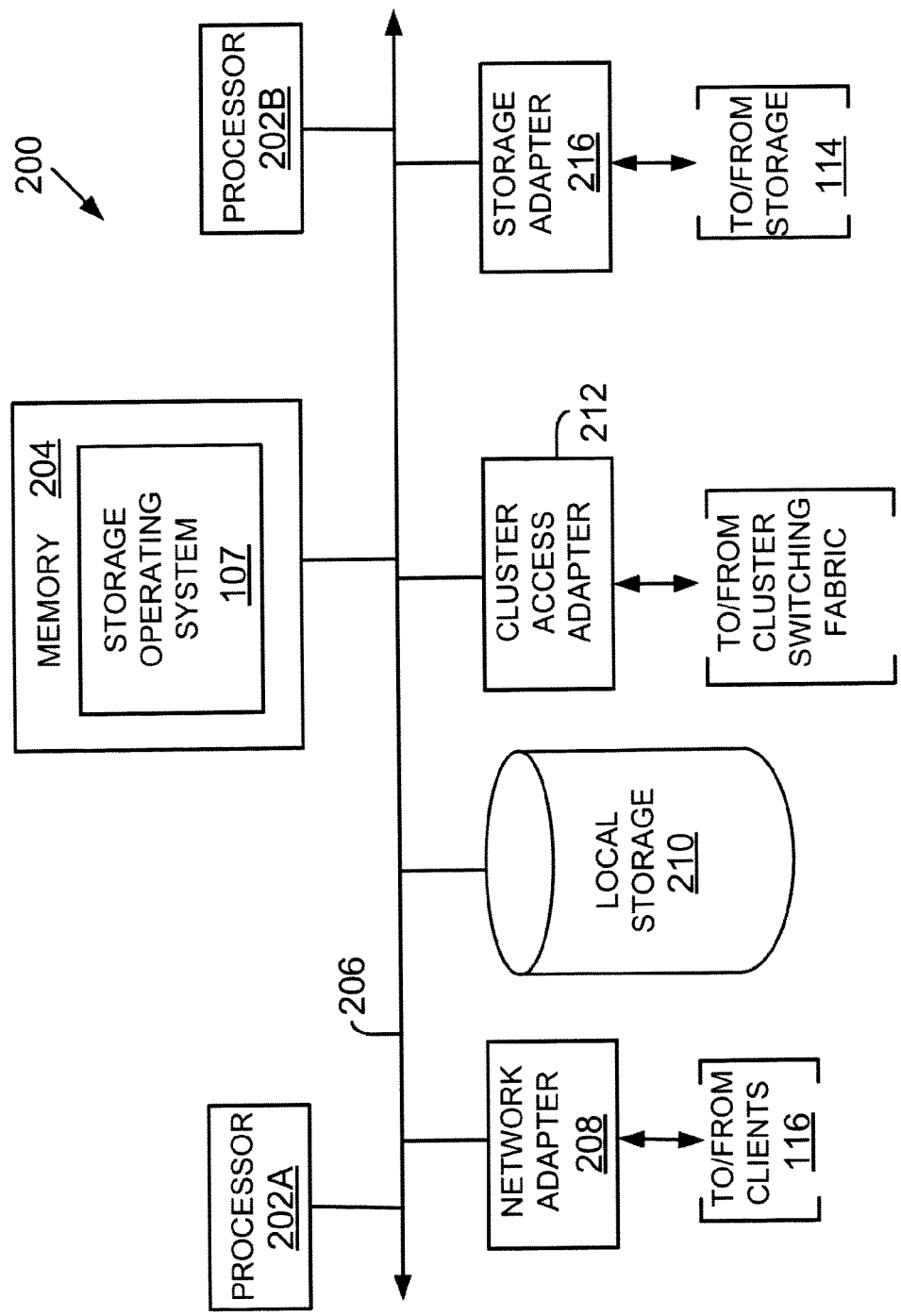
FIG. 2 shows an example of a storage system, used according to one embodiment.

Storage System:

FIG. 2 is a block diagram of a system 200, according to one embodiment. System 200 may be used by a stand-alone storage system 108 and/or a storage system node operating within a cluster.

System 200 may include a plurality of processors 202A and 202B, a memory 204, a network adapter 208, a cluster access adapter 212 (used for a cluster environment), a storage adapter 216 and local storage 210 interconnected by a system bus 206. The local storage 210 comprises one or more storage devices, such as disks, utilized by the processors to locally store configuration and other information.

The cluster access adapter 212 comprises a plurality of ports adapted to couple system 200 to other nodes of a cluster (not shown). In the illustrative embodiment, Ethernet may be used as the clustering protocol and interconnect media, although it will be apparent to those skilled in the art that other types of protocols and interconnects may be utilized within the cluster architecture described herein.

System 200 is illustratively embodied as a dual processor storage system executing a storage operating system 107 that preferably implements a high-level module, such as a file system, to logically organize information as a hierarchical structure of named directories, files and special types of files called virtual disks (hereinafter generally "blocks") on storage devices 114. However, it will be apparent to those of ordinary skill in the art that the system 200 may alternatively comprise a single or more than two processor systems. Illustratively, one processor 202 executes the functions of an N-module on a node, while the other processor 202B executes the functions of a D-module.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 107, portions of which is typically resident in memory and executed by the processing elements, functionally organizes the system 200 by, inter alia, invoking storage operations in support of the storage service provided by storage system 108. An example of operating system 107 is the DATA ONTAP (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple the system 200 to one or more clients 116 over point-to-point links, wide area networks, virtual private networks implemented over a public network (Internet) or a shared local area network. The network adapter 208 thus may comprise the mechanical, electrical and signaling circuitry needed to connect storage system 108 to the network. Illustratively, the computer network 207 may be embodied as an Ethernet network or a FC network.

The storage adapter 216 cooperates with the storage operating system 107 executing on the system 200 to access information requested by the clients and management application 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to the disks over an I/O interconnect arrangement, such as a conventional high-performance, FC link topology.

In another embodiment, instead of using a separate network and storage adapter, a converged adapter is used to process both network and storage traffic.

Figure 3:
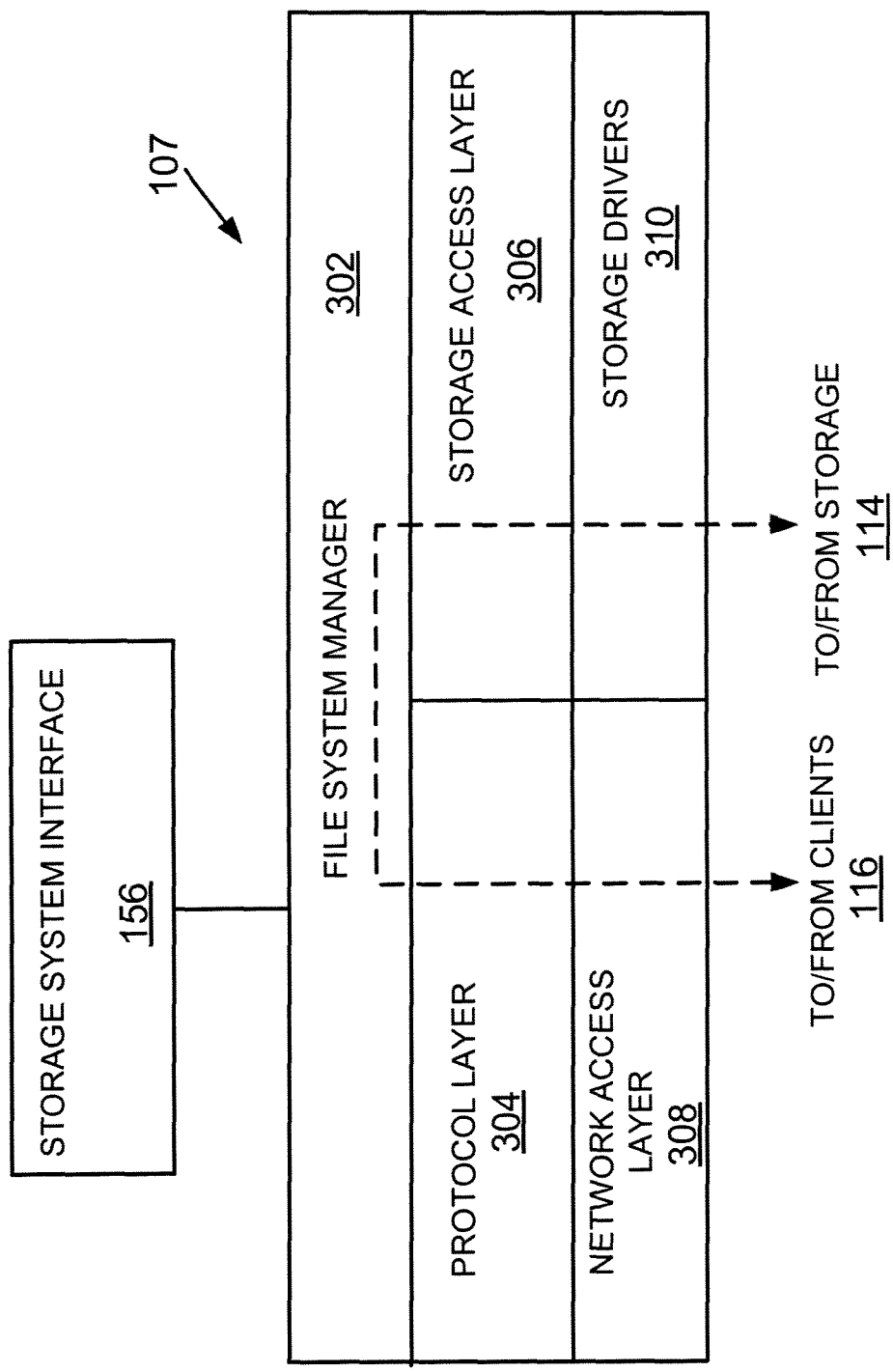
FIG. 3 shows an example of a storage operating system, used according to one embodiment.

Operating System:

FIG. 3 illustrates a generic example of operating system 107 executed by storage system 108, according to one embodiment of the present disclosure. Storage operating system 107 interfaces with storage system interface engine 156 to present logical storage space, which is presented to VMs 105a-105n (FIG. 1A/1B) by VMM 106.

As an example, operating system 107 may include several modules, or "layers". These layers include a file system manager 302 that keeps track of a directory structure (hierarchy) of the data stored in storage devices and manages read/write operations, i.e. executes read/write operations on disks in response to client 116 requests.

Operating system 107 may also include a protocol layer 304 and an associated network access layer 308, to allow system 200 to communicate over a network with other systems, such as host platform 102, clients 116 and management application 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 116 and mass storage devices 114 are illustrated schematically as a path, which illustrates the flow of data through operating system 107.

The operating system 107 may also include a storage access layer 306 and an associated storage driver layer 310 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by storage system 108 in response to a file system request issued by client 114.

As used herein, the term "storage operating system" generally refers to the computer-executable code operable on a computer to perform a storage function that manages data access and may, in the case of system 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
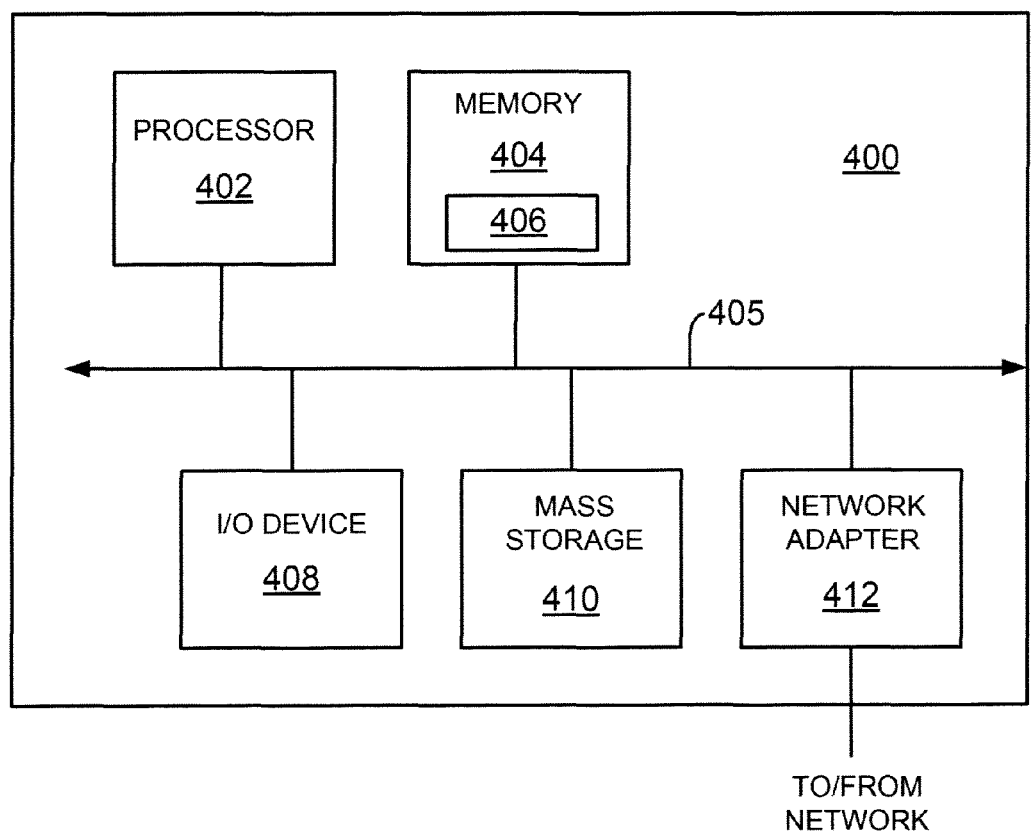
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent management console 118, clients 116 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for correlation logic 162 (FIG. 1D) as well as instructions for executing the process blocks of FIG. 1F/1G.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The correlation logic 162 (and associated methods thereof) and storage systems described above can be a part of the server layer for providing storage services. Details regarding these layers are not germane to the inventive embodiments.

Thus, a method and apparatus for correlating virtual drives presented to a virtual machine have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for a storage operating environment having a processor executable virtual machine using a storage system for storing information at a storage device, comprising:

providing a path for a data container to a processor executable application, where the data container is used for presenting a virtual storage drive to the virtual machine for accessing storage space at the storage device;

generating a data structure for correlating the data container with the virtual storage drive by querying a management interface module executed by a computing system to obtain an identifier of a controller for the virtual storage drive and a location of the virtual storage drive maintained by the virtual controller; wherein the processor executable application generates the data structure; and using the identifier and the location to correlate the data container with the virtual storage drive presented by the virtual machine to a user; wherein the processor executable application correlates the data container with the virtual storage drive and presents the correlation via a user interface on a display device.

2. The method of claim 1, wherein the storage system presents storage space to a virtual machine monitor.

3. The method of claim 2, wherein the virtual machine monitor presents the data container to the virtual machine as the virtual storage drive.

4. The method of claim 1, wherein the data container is one of a plurality of data containers that are presented by the virtual machine as a plurality of virtual storage drives.

5. The method of claim 4, wherein the application correlates the plurality of data containers with the plurality of virtual storage drives and presents the correlation via the user interface on the display device.

6. The method of claim 4, wherein the plurality of virtual storage drives include a replicated copy of a storage space that is maintained by the storage system and the user restores a data container from the replicated copy after the correlation.

7. The method of claim 4, wherein the management interface module maintains a hierarchical structure with a plurality of objects storing the identifier and the location information and the path is used as an input to the hierarchical structure to obtain the identifier and the location information.

8. A system, comprising:

a computing system executing a virtual machine that uses a storage system for storing information at a storage device; and a processor executable application that receives a path for a data container, where the data container is used for presenting a virtual storage drive to the virtual machine for accessing storage space at the storage device; wherein the application is configured to generate a data structure for correlating the data container with the virtual storage drive by querying a management interface module executed by the computing system to obtain an identifier of a controller for the virtual storage drive and a location of the virtual storage drive maintained by the controller; and wherein the processor executable application using the identifier and the location correlates the data container with the virtual storage drive and presents the correlation via a user interface on a display device.

9. The system of claim 8, wherein the data container is one of a plurality of data containers that are presented by the virtual machine as a plurality of virtual storage drives.

10. The system of claim 9, wherein the application correlates the plurality of data containers with the plurality of virtual storage drives and presents the correlation via the user interface on the display device.

11. The system of claim 8, wherein the management interface module maintains a hierarchical structure with a plurality of objects storing the identifier and the location.

12. The system of claim 11, wherein the path is used as an input to the hierarchical structure to obtain the identifier and the location information.

13. The system of claim 8, wherein the storage system presents storage space to a virtual machine monitor.

14. The system of claim 13, wherein the virtual machine monitor presents the data container to the virtual machine as the virtual storage drive.

15. A machine implemented method for a storage operating environment having a processor executable virtual machine using a storage system for storing information at a storage device, comprising:
    generating a data structure for correlating a data container to a virtual storage drive presented by a virtual machine to a user for accessing storage space at the storage device; wherein a processor executable application generates the data structure by querying a management interface module to obtain an identifier of a virtual controller for the virtual storage drive and a location of the virtual storage drive as maintained by the virtual controller; and
    correlating the data container with the virtual storage drive as presented by the virtual machine by using the identifier and the location; wherein the processor executable application correlates the data container with the virtual storage drive and presents the correlation to the user.

16. The method of claim 15, wherein the data container is one of a plurality of data containers that are presented by the virtual machine as a plurality of virtual storage drives.

17. The method of claim 16, wherein the application correlates a plurality of data containers with the plurality of virtual storage drives and presents the correlation via a user interface on a display device.

18. The method of method of claim 16, wherein the plurality of virtual storage drives include a replicated copy of a storage space that is maintained by the storage system and the user restores a data container from the replicated copy after the correlation.

19. The method of claim 15, wherein the management interface module maintains a hierarchical structure with a plurality of objects storing the identifier and the location information.

20. The method of claim 19, wherein a path for the data container is used as an input to the hierarchical structure to obtain the identifier and the location information.

21. A system, comprising:
    a memory having machine readable medium comprising machine executable code having instructions stored thereon; and a processor module coupled to the memory configured to execute the machine executable code to:
    generate a data structure for correlating a data container to a virtual storage drive presented by a virtual machine to a user for accessing storage space at the storage device; wherein the data structure is generated by querying a management interface module to obtain an identifier of a controller for the virtual storage drive and a location of the virtual storage drive as maintained by the controller; and
    correlate the data container with the virtual storage drive as presented by the virtual machine by using the identifier and the location; wherein a processor executable application correlates the data container with the virtual storage drive and presents the correlation to the user.

22. The system of claim 21, wherein the management interface module maintains a hierarchical structure with a plurality of objects storing the identifier and the location information.

23. The system of claim 22, wherein a path for the data container is used as an input to the hierarchical structure to obtain the identifier and the location information.

24. A non-transitory, machine readable storage medium having stored thereon instructions for performing a method, comprising machine executable code which when executed by at least one machine, causes the machine to:
    generate a data structure for correlating a data container to a virtual storage drive presented by a virtual machine to a user for accessing storage space at the storage device; wherein the data structure is generated by querying a management interface module to obtain an identifier of a controller for the virtual storage drive and a location of the virtual storage drive as maintained by the controller; and
    correlate the data container with the virtual storage drive as presented by the virtual machine by using the identifier and the location; wherein a processor executable application correlates the data container with the virtual storage drive and presents the correlation to the user.

25. The storage medium of claim 24, wherein the management interface module maintains a hierarchical structure with a plurality of objects storing the identifier and the location information.

26. The storage medium of claim 25, wherein a path for the data container is used as an input to the hierarchical structure to obtain the identifier and the location information.

* * * * *